US010946759B2

(12) United States Patent
Sakuma et al.

(10) Patent No.: US 10,946,759 B2
(45) Date of Patent: Mar. 16, 2021

(54) INFORMATION PROVIDING METHOD, INFORMATION PROVIDING SYSTEM AND TERMINAL EACH FOR ELECTRICALLY POWERED VEHICLE

(71) Applicant: TOYOTA JIDOSHA KABUSHIKI KAISHA, Toyota (JP)

(72) Inventors: Satoru Sakuma, Nagakute (JP); Shuhei Yamamoto, Aichi-ken (JP); Munehiro Kamiya, Anjo (JP); Hideo Hasegawa, Nagoya (JP); Shinji Kurachi, Nagoya (JP); Tomoya Shimizu, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 105 days.

(21) Appl. No.: 16/173,548

(22) Filed: Oct. 29, 2018

(65) Prior Publication Data

US 2019/0126767 A1 May 2, 2019

(30) Foreign Application Priority Data

Oct. 31, 2017 (JP) .............................. JP2017-210312

(51) Int. Cl.
*B60L 53/60* (2019.01)
*G08G 1/14* (2006.01)
(Continued)

(52) U.S. Cl.
CPC ............... *B60L 53/60* (2019.02); *B60L 53/14* (2019.02); *B60L 53/31* (2019.02);
(Continued)

(58) Field of Classification Search
CPC .......... B60L 53/60; B60L 53/14; B60L 53/31; G06Q 30/0259; G06Q 30/0261; G08G 1/143; G08G 1/144; G08G 1/148
See application file for complete search history.

(56) References Cited

U.S. PATENT DOCUMENTS

2012/0197690 A1\* 8/2012 Agulnek ............ G01C 21/3697
705/14.1
2013/0162221 A1\* 6/2013 Jefferies .................. B60L 53/14
320/155

(Continued)

FOREIGN PATENT DOCUMENTS

JP H10300488 A 11/1998
JP 2001357279 A 12/2001
(Continued)

OTHER PUBLICATIONS

Nationwide Map for EV and PHV Charging :Capable of Showing Status of Use On -Line ! (Power Receiving Spot SearchApplication), Mar. 14, 2015, URL, https://octoba.net/archives/20150313-android-app-evphvcharfemap-415821.html, 5 pages.

*Primary Examiner* — Aaron L Troost
(74) *Attorney, Agent, or Firm* — Hunton Andrews Kurth LLP

(57) ABSTRACT

A plurality of charging stations and a plurality of commercial facilities where a user of a vehicle can stay during charging in one of the plurality of charging stations are provided. An information providing method for the vehicle includes: causing a charging server to select a plurality of candidates from among the plurality of charging stations in accordance with location information about each of the vehicle and the plurality of commercial facilities; causing the charging server to provide a car navigation device with information showing the plurality of candidates selected; causing the server to deliver an advertisement for a commercial facility associated with each of the plurality of candidates selected; and causing the charging server to receive information about a candidate selected with the car navigation device from among the plurality of candidates by the user referring to the advertisement.

1 Claim, 13 Drawing Sheets

<PRESENTATION OF RECOMMENDED PLAN>

RECOMMENDED PLAN 1

| 14:45 | CURRENT TIME |
| 15:00 | ARRIVE AT CHARGING STATION A (START QUICK CHARGING) |
| 15:10 | PPP CAFETERIA |
| 15:40 | COMPLETION OF QUICK CHARGING |
| 15:45 | RESTART |
| 18:30 | ARRIVE AT DESTINATION |

(51) Int. Cl.
*B60L 53/14* (2019.01)
*B60L 53/31* (2019.01)
*G06Q 30/02* (2012.01)

(52) U.S. Cl.
CPC ..... *G06Q 30/0259* (2013.01); *G06Q 30/0261* (2013.01); *G08G 1/143* (2013.01); *G08G 1/144* (2013.01); *G08G 1/148* (2013.01)

(56) References Cited

U.S. PATENT DOCUMENTS

| | | | | |
|---|---|---|---|---|
| 2014/0129139 A1* | 5/2014 | Ellison | ............... | G01C 21/3469 |
| | | | | 701/533 |
| 2015/0106001 A1* | 4/2015 | Lee | ............... | G01C 21/36 |
| | | | | 701/123 |
| 2015/0285652 A1* | 10/2015 | Peri | ............... | G01C 21/3476 |
| | | | | 701/438 |

FOREIGN PATENT DOCUMENTS

| | | | | |
|---|---|---|---|---|
| JP | 2004102416 A | | 4/2004 | |
| JP | 2006112932 A | * | 4/2006 | ............. B60L 53/60 |
| JP | 2008090681 A | | 4/2008 | |
| JP | 2013-064686 A | | 4/2013 | |
| JP | 2013-170932 A | | 9/2013 | |
| JP | 2013222278 A | | 10/2013 | |
| JP | 2017015419 A | | 1/2017 | |

\* cited by examiner

FIG.5

<VEHICLE INFORMATION>

| VEHICLE ID | VEHICLE TYPE | STATUS OF USE | | | CURRENT LOCATION | DESTINATION | SOC | ELECTRIC POWER CONSUMPTION | PREFERENCES |
|---|---|---|---|---|---|---|---|---|---|
| | | BEING PARKED | BEING TRAVELING | BEING CHARGED | | | | | |
| A001 | | Y | | | P1 | D1 | SOC1 | Ah1 | |
| A002 | | | Y | | P2 | – | SOC2 | Ah2 | |
| A003 | | | | Y | P3 | D3 | SOC3 | Ah3 | |
| A004 | | | Y | | P4 | D4 | SOC4 | Ah4 | |
| ⋮ | | | | | | | | | |

FIG.6

<CHARGING INFORMATION>

| CHARGING STATION ID | NORMAL CHARGING | | QUICK CHARGING | | FEE | | PROVISION OF ADVERTISEMENT |
|---|---|---|---|---|---|---|---|
| | IN USE | AVAILABLE | IN USE | AVAILABLE | NORMAL | QUICK | |
| B001 | | | | | | | SUPPORTED |
| B002 | | | | | | | SUPPORTED |
| B003 | | | | | | | NOT SUPPORTED |
| B004 | | | | | | | SUPPORTED |
| ⋮ | | | | | | | |

FIG.7

<ADVERTISEMENT INFORMATION>

| ADVERTISEMENT ID | FACILITIES | ADVERTISEMENT CONTENTS | REQUIRED TIME |
|---|---|---|---|
| C001 | | | |
| C002 | | | |
| C003 | | | |
| C004 | | | |
| ⋮ | | | |

FIG.9

<REGISTRATION OF PREFERENCES>

WHAT KIND OF FACILITIES DO YOU DESIRE TO
RECEIVE DELIVERY OF ADVERTISEMENTS ?

| | |
|---|---|
| RESTAURANT | YES |
| CAFETERIA | NO |
| BOOKSTORE | YES |
| MOVIE THEATER | NO |
| BOWLING STADIUM | NO |
| SHOPPING MALL | NO |

FIG.10

<SETTING OF DESIRED CHARGING MANNER>

QUICK CHARGING REQUIRES ABOUT 40 MINUTES (ABOUT XXX YEN) UNTIL FULL CHARGE
NORMAL CHARGING REQUIRES ABOUT 3 HOURS (ABOUT YYY YEN) UNTIL 50% OF CHARGING
SELECT YOUR DESIRED CHARGING MANNER

PRIORITIZE TIME (QUICK CHARGING IS DESIRED)

PRIORITIZE LEISURE ACTIVITY
(EITHER QUICK CHARGING OR NORMAL CHARGING IS ACCEPTABLE)

PRIORITIZE CHEAPER FEE FOR CHARGING
(NORMAL CHARGING IS DESIRED)

NUMBER OF PEOPLE WHO PARTICIPATE IN LEISURE ACTIVITY

NUMBER OF PEOPLE    THREE

FIG.11

<PRESENTATION OF RECOMMENDED PLAN>

RECOMMENDED PLAN 1

| 14:45 | CURRENT TIME |
| 15:00 | ARRIVE AT CHARGING STATION A (START QUICK CHARGING) |
| 15:10 | PPP CAFETERIA |
| 15:40 | COMPLETION OF QUICK CHARGING |
| 15:45 | RESTART |
| 18:30 | ARRIVE AT DESTINATION |

FIG.12

RECOMMENDED PLAN 2

| 14:45 | CURRENT TIME |
| 14:50 | ARRIVE AT CHARGING STATION B (START NORMAL CHARGING) |
| 15:00 | MOVIE THEATER (MOVIE STARTS) |
| 17:00 | MOVIE ENDS |
| 17:10 | SHOPPING |
| 18:00 | COMPLETION OF NORMAL CHARGING |
| 18:10 | RESTART |
| 20:30 | ARRIVE AT DESTINATION |

FIG.13

<PROVIDE COUPON>

SPECIAL SERVICES IN COMMERCIAL FACILITIES A

| PPP CAFETERIA | DISCOUNT OF 20% FOR DESSERT |

| QQQ THEATER | MOVIE STARTS AT 15:00<br>MOVIE ENDS AT 17:00<br>DISCOUNT OF 10% FOR TICKET |

| RRR BOWL | SHOES ARE FREE OF CHARGE |

INFORMATION PROVIDING METHOD, INFORMATION PROVIDING SYSTEM AND TERMINAL EACH FOR ELECTRICALLY POWERED VEHICLE

This nonprovisional application is based on Japanese Patent Application No. 2017-210312 filed on Oct. 31, 2017 with the Japan Patent Office, the entire contents of which are hereby incorporated by reference.

BACKGROUND

Field

The present disclosure relates to an information providing method, an information providing system and a terminal each for an electrically powered vehicle, and more particularly to a technique for providing an electrically powered vehicle with information used for charging a power storage device mounted in the electrically powered vehicle.

Description of the Background Art

In recent years, an electrically powered vehicle (a plug-in hybrid vehicle or an electric vehicle) configured to be externally charged has started to become widespread. Generally, when charging the power storage device mounted in such an electrically powered vehicle (so-called external charging), it takes longer time than when supplying oil to a vehicle equipped with an engine as a power source (a gasoline-powered vehicle and the like). Accordingly, if a user can spend the charging time (the waiting time for external charging) at positions other than charging facilities (which are also referred to as a charging stand, a charging station, and the like), it is conceivable that the user's convenience can be enhanced.

For example, Japanese Patent Laying-Open No. 2013-064686 discloses that, when external charging is required, a user is guided to a charging facility around which there are facilities (convenience stores, leisure facilities, shopping facilities, and the like) that can be utilized by the user during charging (for example, see Abstract and paragraph [0149] in Japanese Patent Laying-Open No. 2013-064686).

Furthermore, Japanese Patent Laying-Open No. 2013-170932 discloses that a user is provided with information about charging facilities where the user can effectively spend the charging time (for example, see paragraphs [0038] to [0043] in Japanese Patent Laying-Open No. 2013-170932).

SUMMARY

For example, Japanese Patent Laying-Open No. 2013-170932 discloses in paragraph [0041] that the user is provided with information about: (i) the route from a charging facility to surrounding facilities (commercial facilities such as a restaurant); (ii) the distance from the charging facility to the surrounding facilities; (iii) the required time from the charging facility to the surrounding facilities; and the like. However, only the above-mentioned information may not be sufficient for the user to select the user's desired surrounding facilities. Thus, there is still a need to improve the details of the information provided to the user.

The present disclosure has been made to solve the above-described problems. An object of the present disclosure is to provide a technique for allowing a user to effectively utilize the charging time while an electrically powered vehicle is charged.

(1) An information providing method for an electrically powered vehicle according to an aspect of the present disclosure provides information that is used for charging a power storage device mounted in a vehicle with electric power supplied from outside the vehicle. The information providing method for an electrically powered vehicle includes: the first step of causing a server to select a plurality of candidates from among a plurality of charging facilities each configured to charge the power storage device in accordance with (i) location information about the vehicle, (ii) location information about each of the plurality of charging facilities and (iii) location information about each of a plurality of surrounding facilities where a user of the vehicle can stay during charging in a corresponding charging facility of the plurality of charging facilities; the second step of causing the server to provide a terminal (a car navigation device, a mobile terminal, and the like) used by the user with information showing the plurality of candidates selected; the third step of causing the server to deliver an advertisement for a surrounding facility associated with each of the plurality of candidates selected; and the fourth step of causing the server to receive information input into the terminal about a candidate selected from among the plurality of candidates by the user referring to the advertisement for the surrounding facility.

According to the method described in the above (1), the user is provided with advertisements for surrounding facilities together with the information showing a plurality of candidates for the charging facilities. Thereby, the user can select the surrounding facilities providing advertisements that are concern or interest to the user (and a charging facility located therearound). Accordingly, the user can effectively spend the charging time for the electrically powered vehicle.

(2) The information providing method for an electrically powered vehicle further includes causing the user to set in advance a type (a type of industry, a field) of the surrounding facility for which the user desires to receive delivery of an advertisement. The causing the server to deliver an advertisement (the second step) includes delivering, to the terminal of the user, the advertisement for the surrounding facility corresponding to the type set by the user.

According to the method described in the above (2), the user can receive delivery of the advertisement for the surrounding facility corresponding to the type desired by the user. Accordingly, the user can select the type of the surrounding facility that is of great concern or interest to the user himself/herself.

(3) The causing the server to deliver an advertisement (the second step) further includes providing the terminal with a coupon, which can be used when the user utilizes the surrounding facility, together with the advertisement for the surrounding facility.

According to the method described in the above (3), by obtaining a coupon that can be used in the surrounding facility, the user can receive various services such as a discount. In this way, by providing a coupon in addition to an advertisement, it becomes possible to enhance the motivation for the user to utilize the information providing method (the information providing service) according to the present disclosure.

(4) The information providing method for an electrically powered vehicle further includes the fourth step of causing the server to calculate expected charging time for the power storage device using (i) information about a state of charge (SOC) of the power storage device and (ii) information about a charging capability of a charger provided in each of the plurality of charging facilities. The causing the server to deliver an advertisement (the second step) includes delivering, to the terminal, an advertisement for a surrounding facility for which a time difference between the charging time predicted and an expected stay time for the user staying in the surrounding facility is shorter than a prescribed value.

According to the method described in the above (4), the expected charging time and the expected stay time are close to each other. Thus, it becomes possible to suppress that the user stays in the surrounding facility excessively long even though charging has been completed, and also suppress that the user ends utilization of the surrounding facility before completion of charging. In other words, it becomes possible for the user to timely end utilization of the surrounding facility in time to completion of charging.

(5) A charging information providing system for an electrically powered vehicle according to another aspect of the present disclosure provides information that is used for charging a power storage device mounted in a vehicle with electric power supplied from outside the vehicle. The charging information providing system for an electrically powered vehicle includes a database and a server. The database is configured to store (i) location information about each of a plurality of charging facilities each configured to charge the power storage device, and (ii) location information about each of a plurality of surrounding facilities provided around a corresponding charging facility among the plurality of charging facilities, a user of the vehicle being capable of staying in each of the plurality of surrounding facilities during charging in the corresponding charging facility. The server is configured to select a plurality of candidates from among the plurality of charging facilities in accordance with (i) location information about the vehicle, (ii) location information about each of the plurality of charging facilities, and (iii) location information about each of the plurality of surrounding facilities, to provide information showing the plurality of candidates selected, and to deliver an advertisement for a surrounding facility associated with each of the plurality of candidates.

(6) A terminal according to still another aspect of the present disclosure is a terminal for a user of an electrically powered vehicle equipped with a power storage device charged with electric power supplied from outside the electrically powered vehicle. The terminal includes a display and an operation interface. The display is configured to display information showing a plurality of candidates selected from among charging facilities each configured to charge the power storage device, together with an advertisement for a surrounding facility associated with each of the plurality of candidates, in accordance with (i) location information about the electrically powered vehicle, (ii) location information about each of the charging facilities, and (iii) location information about each of surrounding facilities provided around each of the charging facilities. The operation interface is configured to receive an operation to select a candidate from among the plurality of candidates by the user referring to the advertisement.

According to the configurations described in the above (5) and (6), as in the method described in the above (1), the user can effectively spend the charging time during charging of the electrically powered vehicle.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram for illustrating an example of the data structure of vehicle information stored in a vehicle information database.

FIG. 6 is a diagram for illustrating an example of the data structure of charging information stored in a charging information database.

FIG. 7 is a diagram for illustrating an example of the data structure of advertisement information stored in an advertisement information database.

FIG. 9 is a diagram showing an example of a screen for registration of user's preferences.

FIG. 10 is a diagram showing an example of a screen for setting a user's desired charging manner.

FIG. 11 is a diagram showing an example of a display screen showing a recommended plan.

FIG. 12 is a diagram showing another example of the display screen showing a recommended plan.

FIG. 13 is a diagram showing an example of an advertisement screen.

DESCRIPTION OF THE PREFERRED EMBODIMENTS

Figure 1:
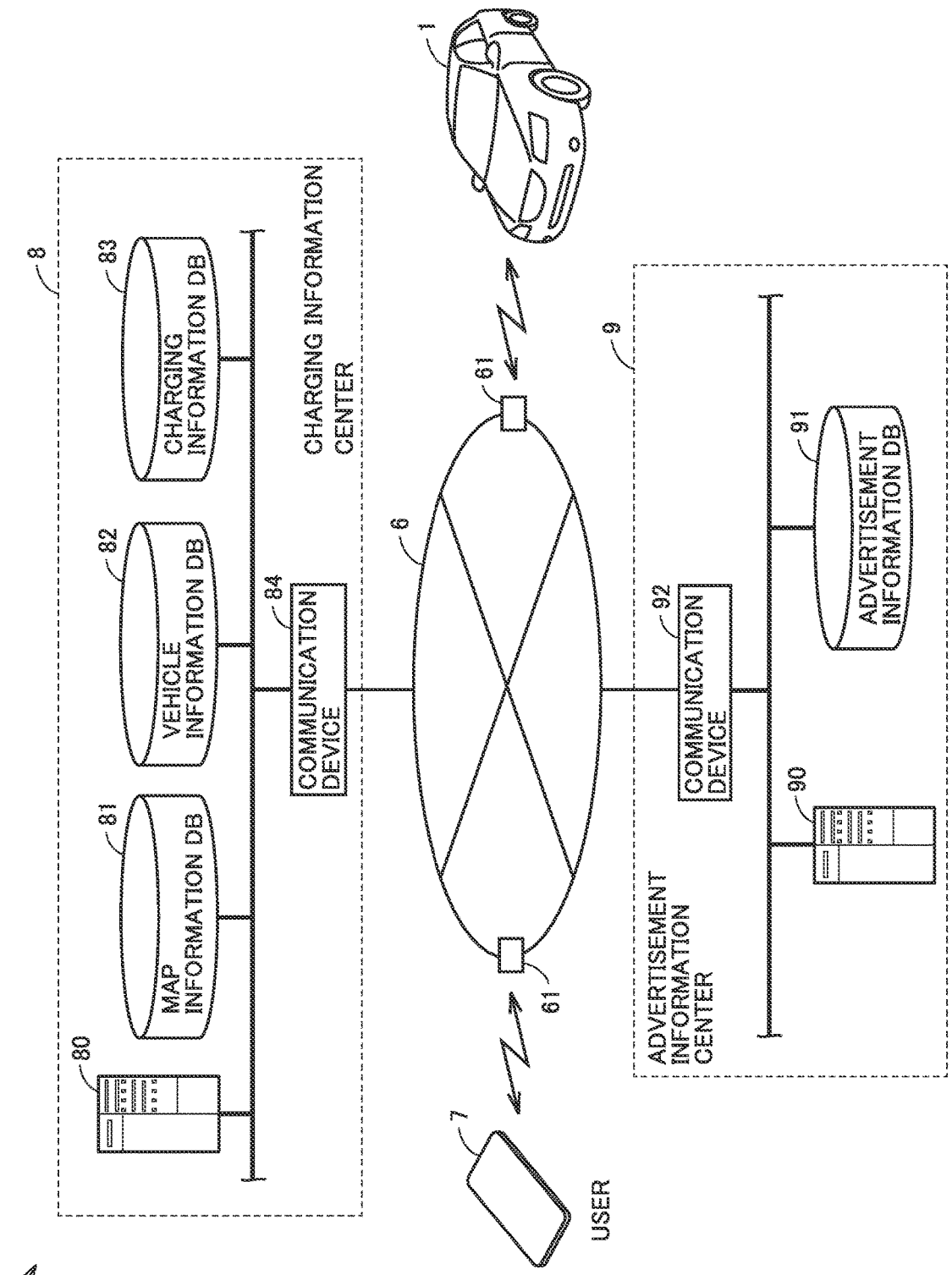
FIG. 1 is a diagram schematically showing the entire configuration of a charging system according to the present embodiment.

Embodiments of the present disclosure will be hereinafter described in detail with reference to the accompanying drawings, in which the same or corresponding components are designated by the same reference characters, and the description thereof will not be repeated.

Embodiments

<Entire Configuration of Charging System>

FIG. 1 is a diagram schematically showing the entire configuration of a charging system according to the present embodiment. Referring to FIG. 1, a charging system 900 includes a vehicle 1, a charging information center 8, and an advertisement information center 9.

Vehicle 1 is an electric vehicle (EV), for example. However, vehicle 1 only has to be configured to be chargeable from outside, and may be a plug-in hybrid vehicle. Although FIG. 1 shows only one vehicle 1 for preventing complicated illustration, the number of vehicles 1 is not particularly limited. In fact, charging system 900 includes further more vehicles.

Vehicle 1, charging information center 8 and advertisement information center 9 are configured to communicate with each other through a communication network 6 and a base station 61 that is provided over communication network 6. Vehicle 1, charging information center 8 and advertisement information center 9 may also be configured to communicate with a mobile terminal 7 (for example, a smartphone) of a user.

Charging information center 8 includes a charging server 80, a map information database 81, a vehicle information database 82, a charging information database 83, and a communication device 84.

Map information database 81 stores road map data and also stores map information including the location information about charging stations and the location information about commercial facilities (described later). Vehicle information database 82 stores the information showing the status of use of each vehicle 1, the location information about each vehicle 1, and the like (see FIG. 5). Charging information database 83 stores the information showing the status of use of each charging station, the information showing the charging standards appropriate for a charger provided in each charging station, and the like (see FIG. 6). Communication device 84 allows bidirectional communication between charging server 80 and communication network 6.

In response to the charging request from vehicle 1, charging server 80 selects an appropriate charging station from among a plurality of charging stations, and provides vehicle 1 with the information about the selected charging station. The charging request may be transmitted from mobile terminal 7 of the user. The process by charging server 80 and the information stored in each database will be described later in detail.

Advertisement information center 9 is managed by commercial facilities (shopping malls and the like), for example, and includes an advertisement server 90, an advertisement information database 91, and a communication device 92.

Advertisement information database 91 stores the advertisement information about stores (restaurants, cafeterias, and the like) in commercial facilities as a management main body (see FIG. 7). Communication device 92 allows bidirectional communication between advertisement server 90 and communication network 6.

Advertisement server 90 extracts an appropriate advertisement from the advertisement information stored in advertisement information database 91, and then provides the extracted advertisement to vehicle 1. The process by advertisement server 90 and the advertisement information stored in advertisement information database 91 will be described later in detail.

Charging server 80 and advertisement server 90 each correspond to the "server" according to the present disclosure. Charging server 80 and advertisement server 90 may be separately provided as described above, or may be integrally provided.

<Vehicle Configuration>

Figure 2:
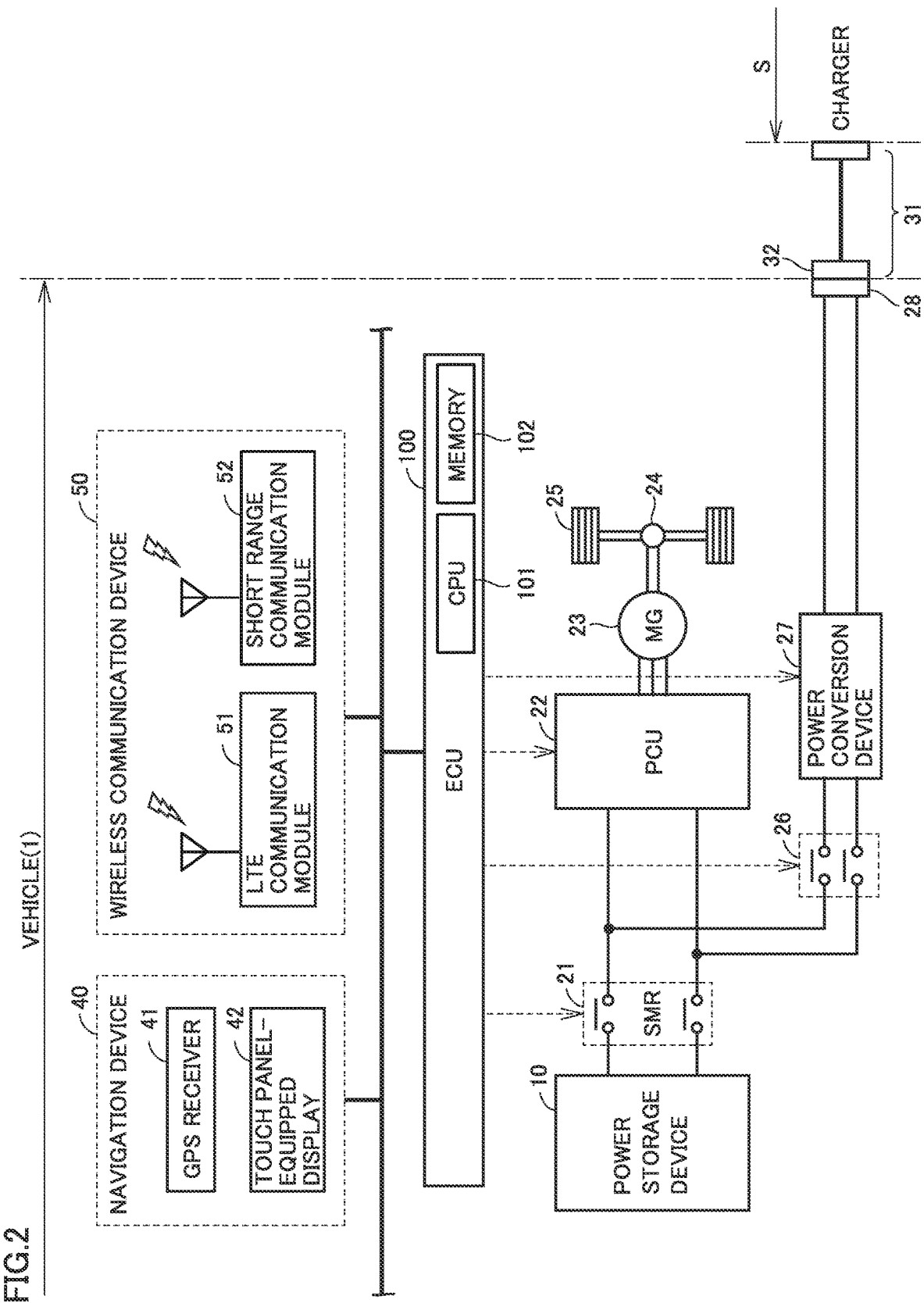
FIG. 2 is a diagram schematically showing the configuration of a vehicle.

FIG. 2 is a diagram schematically showing the configuration of vehicle 1. Referring to FIG. 2, vehicle 1 includes a power storage device 10, a system main relay (SMR) 21, a power control unit (PCU) 22, a motor generator (MG) 23, a power transmission gear 24, a driving wheel 25, and an electronic control unit (ECU) 100.

Power storage device 10 is a rechargeable direct-current (DC) power supply, and configured to include a secondary battery such as a lithium-ion secondary battery or a nickel-metal hydride battery. As power storage device 10, capacitors such as an electric double layer capacitor can also be employed. Power storage device 10 supplies, to PCU 22, electric power for generating driving force for traveling of vehicle 1. Furthermore, power storage device 10 is charged with electric power generated by regenerative braking of motor generator 23 or charged with electric power supplied from outside the vehicle.

SMR 21 is electrically connected between power storage device 10 and PCU 22. SMR 21 is opened/closed according to the command from ECU 100.

PCU 22 performs power conversion between power storage device 10 and motor generator 23 according to the command from ECU 100. PCU 22 is configured to include an inverter (not shown) configured to receive electric power from power storage device 10 to drive motor generator 23, a converter (not shown) configured to adjust the level of the DC voltage supplied to the inverter, and the like.

Motor generator 23 is an alternating-current (AC) electric motor, which is, for example, a permanent-magnet type synchronous electric motor having a rotor incorporating a permanent magnet. Motor generator 23 is driven by the inverter included in PCU 22 to rotate the drive shaft (not shown). The torque output from motor generator 23 is transmitted to driving wheel 25 through power transmission gear 24, thereby driving vehicle 1 to travel. Furthermore, during braking of the vehicle, motor generator 23 receives the rotating force of each driving wheel to generate electric power. The electric power generated by motor generator 23 is stored in power storage device 10 through PCU 22.

Vehicle 1 further includes a charging relay 26, a power conversion device 27 and an inlet 28 each as a configuration for charging power storage device 10 with electric power from outside the vehicle. During external charging of power storage device 10, a charging connector 32 of charging cable 31 is coupled to inlet 28. Then, the electric power supplied from a charger or the like provided in a charging station S is supplied to vehicle 1 through charging cable 31.

Charging relay 26 is electrically connected between power storage device 10 and power conversion device 27. Charging relay 26 is closed and SMR 21 is closed to thereby allow power transfer between inlet 28 and power storage device 10.

Power conversion device 27 is electrically connected between charging relay 26 and inlet 28. According to the command from ECU 100, power conversion device 27 converts the electric power supplied from the charger or the like into electric power with which power storage device 10 can be charged. In addition, power conversion device 27 can also convert the electric power from power storage device 10 into electric power that can be output to the outside of the vehicle.

Vehicle 1 further includes a navigation device 40 and a wireless communication device 50 as the configuration for grasping the traveling conditions of vehicle 1 and for communicating with the outside of the vehicle.

Navigation device 40 includes a GPS receiver 41 configured to specify the current location of vehicle 1 based on radio waves from artificial satellites. Navigation device 40 performs various types of navigation processes for vehicle 1 using the location information about the current location of vehicle 1 specified by GPS receiver 41 (GPS information). More specifically, based on the GPS information about vehicle 1 and the road map data stored in the memory (not shown), navigation device 40 calculates a traveling route (expected traveling route or target route) from the current location of vehicle 1 to its destination, and outputs the information about the traveling route to ECU 100.

Navigation device 40 further includes a touch panel-equipped display 42. Touch panel-equipped display 42 is configured to display the current location of vehicle 1 overlaid on the road map, and to display the information transmitted from charging server 80 to vehicle 1 or the information from ECU 100. Furthermore, touch panel-equipped display 42 receives various operations performed by the user.

Navigation device 40 corresponds to an example of the "terminal" according to the present disclosure. The "terminal" may be mobile terminal 7 of the user. When navigation device 40 serves as a "terminal", touch panel-equipped display 42 corresponds to both the "display" and the "operation interface" according to the present disclosure. Also in the case of mobile terminal 7, the touch panel-equipped display similarly corresponds to the "display" and the "operation interface" according to the present disclosure.

Wireless communication device 50 includes a long term evolution (LTE) communication module 51 and a short range communication module 52. LTE communication module 51 is configured to allow bidirectional data communication with base station 61 in communication network 6. Short range communication module 52 is configured to allow bidirectional data communication with mobile terminal 7 of the user who is located at a short distance (for example, about several meters to several tens of meters) from vehicle 1.

ECU 100 is configured to include a central processing unit (CPU) 101, a memory 102, an input/output port (not shown) through which various signals are input/output, and the like. ECU 100 controls each of devices (SMR 21, PCU 22, charging relay 26, power conversion device 27, and the like) in vehicle 1 such that vehicle 1 is brought into a desired state. Furthermore, ECU 100 transmits and receives various pieces of information (location information about vehicle 1 and the like) to and from each server (charging server 80 or advertisement server 90) through wireless communication device 50 (LTE communication module 51). In addition, mobile terminal 7 also can communicate with charging server 80 and advertisement server 90 through wireless communication device 50 (LTE communication module 51 and short range communication module 52).

<Waiting Time During External Charging>

In the case of vehicle 1 configured as described above, the state of charge (SOC) of power storage device 10 may decrease during traveling, which may require charging of power storage device 10.

Figure 3:
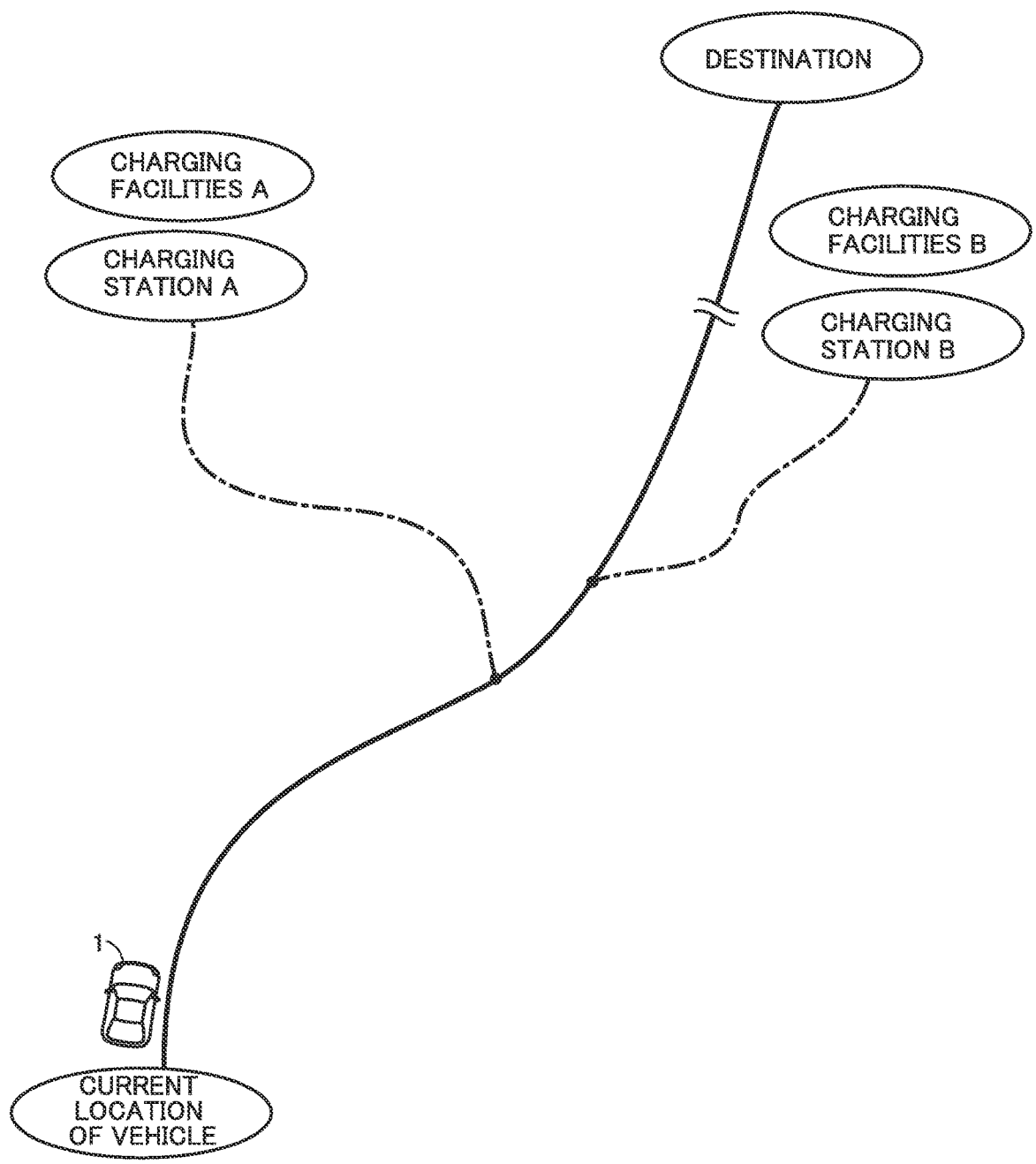
FIG. 3 is a diagram for illustrating the traveling conditions of the vehicle.

FIG. 3 is a diagram for illustrating an example of the traveling conditions of vehicle 1. In this case, as shown in FIG. 3, an explanation will be given with reference to an example of the situation where the SOC of power storage device 10 of vehicle 1 decreases during traveling toward its destination. In such a case, a charging request is transmitted from vehicle 1 to charging server 80. In response to this charging request (and the user's desired charging conditions associated therewith), charging server 80 searches for the charging information stored in charging information database 83. As a result, two charging stations A and B are selected as candidates (which will be described later in detail). Also, commercial facilities A and B are located adjacent to charging stations A and B, respectively.

Figure 4:
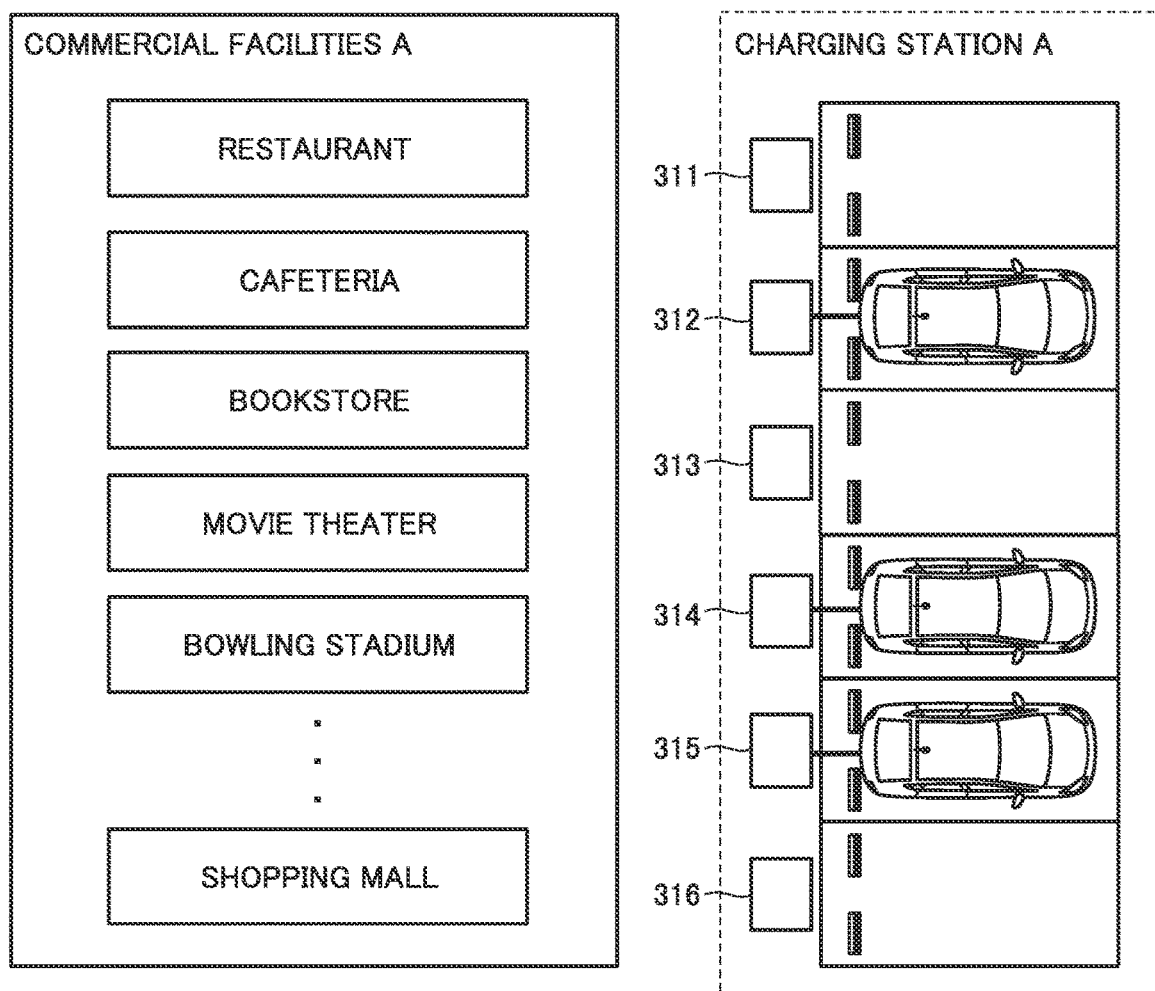
FIG. 4 is a diagram for illustrating an example of a charging station and the situation around the charging station.

FIG. 4 is a diagram for illustrating an example of charging station A and the situation around this charging station A. As shown in FIG. 4, a plurality of chargers 311 to 316 are installed in charging station A. In FIG. 4, only six chargers are shown due to limitations of space, but further more chargers may be installed. Alternatively, the number of chargers may be five or less.

In commercial facilities A, for example, various types of stores such as a restaurant, a cafeteria (a coffee shop), a bookstore, a movie theater, a bowling stadium, and a shopping mall provide services. Although not shown, various types of stores similarly provide services also in commercial facilities B located adjacent to charging station B.

In addition, commercial facilities A and B correspond to "surrounding facilities" according to the present disclosure. However, the types of the "surrounding facilities" are not particularly limited as long as the "surrounding facilities" are located around the charging station and the user can enter the facilities. For example, the "surrounding facilities" may be an art museum, a museum, a zoo, an aquarium, a park, a ball game ground, and the like.

Furthermore, in the above explanation, charging station A is located adjacent to commercial facilities A, but it is not indispensable that charging station A and commercial facilities A adjoin to each other. Charging station A and commercial facilities A may be located at a short distance from each other (for example, within the range in which the user can move around on foot). The same also applies to charging station B and commercial facilities B.

It takes longer time (typically, several tens of minutes to several hours) for charging (externally charging) power storage device 10 mounted in vehicle 1 than for supplying oil to a gasoline-powered vehicle, a diesel vehicle and the like. Accordingly, it is conceivable that the user's convenience can be enhanced if the user can spend the charging time at positions other than the charging station.

When the user selects the position (the facility) where the user spends such the waiting time, it is preferable to provide the user with appropriate information so as to allow the user to readily make a decision. Particularly when there are a plurality of candidates such as charging stations A and B (and commercial facilities A and B that are respectively located adjacent thereto), it is preferable that the user can select a facility that is of concern or interest to the user.

Thus, the present embodiment employs the configuration in which advertisements of commercial facilities A and B are delivered to the user before the user selects the charging station where external charging is performed. This process is also referred to as an "advertisement delivery process", which will be hereinafter described in detail.

<Data Structure>

The advertisement delivery process is implemented using the information stored in each of the databases in charging information center 8 and advertisement information center 9. Thus, the data structure of the information stored in each of these databases will be first sequentially described below.

FIG. 5 is a diagram for illustrating an example of the data structure of the vehicle information stored in vehicle information database 82. As shown in FIG. 5, the vehicle information includes the information about various vehicles 1, for example, including identification information (ID) about each vehicle, vehicle types, status of use, current locations, destinations, and the like. The information about the status of use of the vehicle indicates, for example, that the vehicle is being parked, the vehicle carrying a user is being traveling, the vehicle is being externally charged, or the like. The vehicle information includes the information about the SOC of power storage device 10, and the information about the electric power consumption (which may be an actual value for each vehicle, or may be a value that is set in accordance with each vehicle type).

The vehicle information further includes the information indicating interests, likings, hobbies, tastes and the like of the user of the vehicle (which will be hereinafter referred to as a "preference"). As will be described later with reference to FIG. 9, the user registers in advance the type of the store that the user desires to receive delivery of its advertisement. In accordance with the registered details, the user's interests, likings and the like can be classified into categories. The information about preferences can be represented by the information for distinguishing such the categories (for example, the number allocated to each category). By way of example, the preferences of the user who desires to receive delivery of advertisements for restaurants, cafeterias, movie theaters, and shopping malls can be classified as "category 1".

FIG. 6 is a diagram for illustrating an example of the data structure of charging information stored in charging information database 83. Referring to FIG. 6, the charging information includes: the identification information about each charging station; the information about the charging standards appropriate for the charger provided in each charging station (charging formats such as quick charging and normal charging); and the information about the status of use for each charger and the fee for charging of each charger. The information about the status of use of each charger includes the information about the number of chargers in use and the number of available chargers for each appropriate charging standard. The information about the charger in use may also further include the information about the time remaining until completion of charging. The information about the fee for charging indicates the charged fee per unit amount of charging power or the charged fee per unit time.

In the present embodiment, the charging information includes the information as to whether each charging station is a candidate or not for which the advertisement delivery process is performed. When a charging station is a candidate for which the advertisement delivery process is performed, the advertisements of the commercial facilities located adjacent to this candidate charging station are delivered. When this charging station is not a candidate for which the advertisement delivery process is performed, such information of advertisements is not delivered. Charging server 80 may guide the user preferentially to the charging station and the commercial facilities selected as candidates for which the advertisement delivery process is performed.

FIG. 7 is a diagram for illustrating an example of the data structure of advertisement information stored in advertisement information database 91. Referring to FIG. 7, the advertisement information includes advertisement contents for each facility for which an advertisement is delivered. The advertisement contents may be an advertisement for each facility, may be a message from each facility, or may be privileges (the so-called coupon) such as discounts obtained when the user utilizes each facility. Furthermore, the advertisement information also defines the required time expected that the user will utilize each facility (expected stay time). For example, the expected stay time in a restaurant is one hour, the expected stay time in a cafeteria is 30 minutes, and the expected stay time in a movie theater is two hours.

<Advertisement Delivery Process Sequence>

The advertisement delivery process is implemented by exchanging various pieces of information among vehicle 1, charging information center 8 and advertisement information center 9. Thus, the details of the advertisement delivery process will be hereinafter described with reference to the sequence diagram. The advertisement server configured to deliver the advertisements of commercial facilities A is designated as an "advertisement server A" and the advertisement server configured to deliver the advertisements of commercial facilities B is designated as an "advertisement server B" so as to be distinguished from each other.

Figure 8:
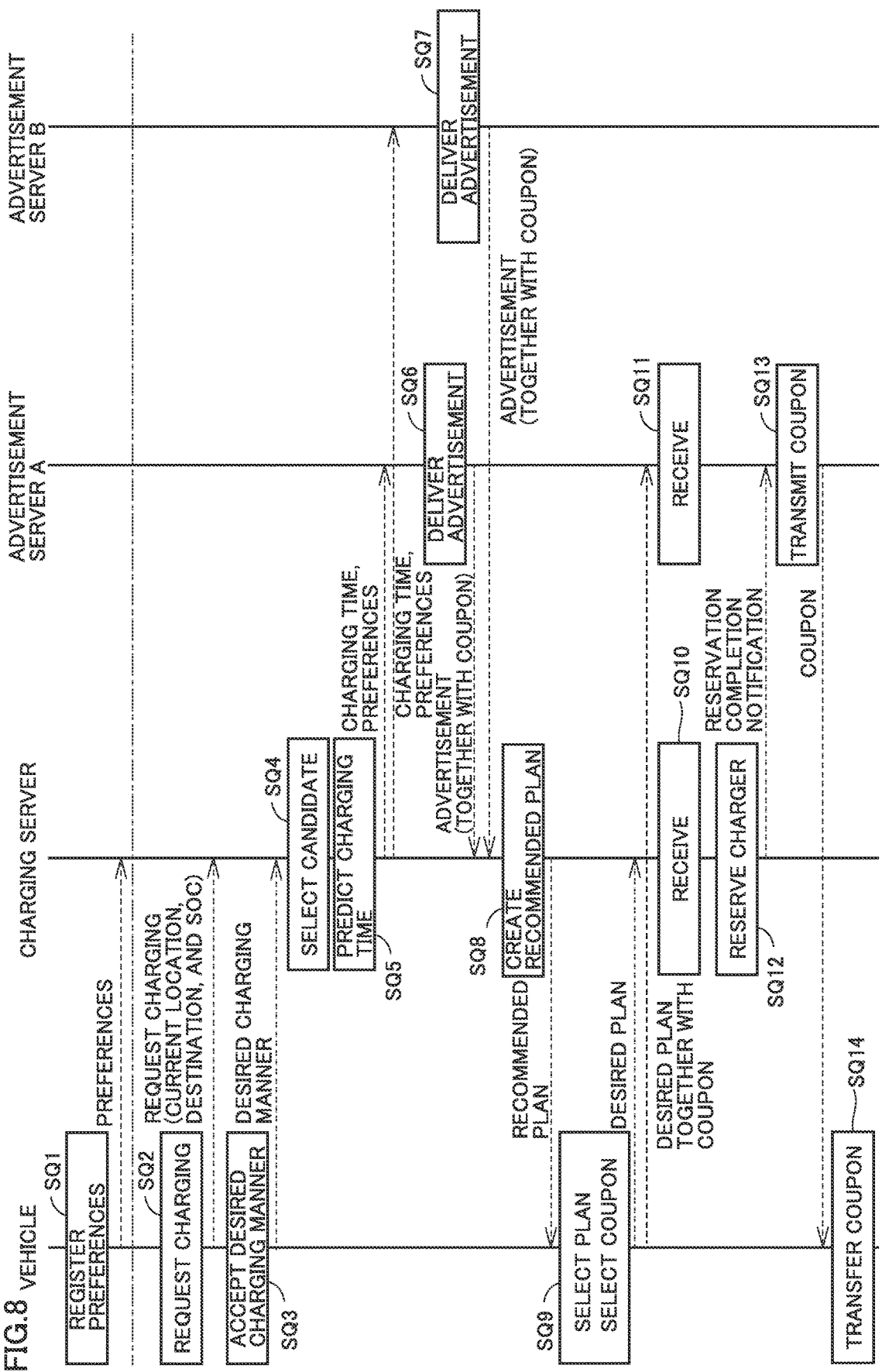
FIG. 8 is a sequence diagram of an advertisement delivery process in the present embodiment.

FIG. 8 is a sequence diagram of the advertisement delivery process in the present embodiment. FIG. 8 illustrates the sequence process (indicated by SQ) performed by vehicle 1 (ECU 100 in vehicle 1), charging server 80, advertisement server A, and advertisement server B sequentially from left to right in the figure.

Referring to FIGS. 1, 2 and 8, first, the user operates touch panel-equipped display 42 of navigation device 40 to set (register) the user's preferences (SQ1). It is preferable that this registration is performed before the SOC of power storage device 10 decreases (before the SOC falls below a prescribed reference value REF). However, since the user's interest and the like may also change, the preferences can be updated as appropriate. In place of the operation through touch panel-equipped display 42, the user may operate mobile terminal 7 to register his/her preferences.

FIG. 9 is a diagram showing an example of a screen for registration of user's preferences. As shown in FIG. 9, it is registered whether the user desires to receive delivery of an advertisement for each of various facilities such as a restaurant, a cafeteria, a bookstore, a movie theater, a bowling stadium, and a shopping mall, for example. This registration information is stored as part of the vehicle information (see FIG. 5) in vehicle information database 82, as described above.

Referring back to FIG. 8, for example, when the SOC of power storage device 10 falls below reference value REF, ECU 100 generate a charging request (SQ2). The charging request may be generated by the user's manual operation (by operating touch panel-equipped display 42 or mobile terminal 7). When the charging request is generated, vehicle 1 accepts the operation performed by the user for setting the user's desired charging manner (SQ3).

FIG. 10 is a diagram showing an example of a screen for setting the user's desired charging manner. As shown in FIG. 10, touch panel-equipped display 42 shows the information about the charging time that is predicted from the current SOC of power storage device 10. FIG. 10 shows an example in which quick charging (charging with three-phase AC 200V) requires about 40 minutes until full charge and normal charging (charging with AC 200V) requires about three hours until charging up to SOC=50%.

Upon confirmation of the predicted value of the charging time, the user selects the user's desired charging manner through touch panel-equipped display 42. For example, as shown in FIG. 10, the user can select (i) whether charging time reduction is prioritized (that is, whether quick charging is desired); (ii) whether leisure activities during charging are prioritized (whether either quick charging or normal charging may be acceptable); and (iii) whether reduction in fee for charging is prioritized (whether normal charging with generally cheaper fee for charging is desired). Furthermore, through touch panel-equipped display 42, the user inputs the number of people participating in the leisure activity during charging time. The information set by the user is transmitted to charging server 80 together with the charging request.

Again referring to FIG. 8, charging server 80 having received the charging request and various pieces of information selects the candidate for the charging station that satisfies the user's desired charging manner conditions (SQ4). More specifically, when the user desires quick charging, charging server 80 leaves as a candidate the charging station equipped with the charger accommodating quick charging, but excludes, from a candidate, the charging station equipped with only the charger accommodating normal charging. When the user sets to prioritize the leisure activities during charging, charging server 80 leaves as a candidate the charging station located in the vicinity of the commercial facilities including facilities that match the user's preferences but excludes, from a candidate, the charging station located in the vicinity of the commercial facilities not including facilities that match the user's preferences. When the user sets to prioritize charging cost reduction, charging server 80 leaves as a candidate the charging station requiring relatively low fee for charging, but excludes from a candidate the charging station requiring relatively high fee for charging.

In this way, charging server 80 selects the candidate for the charging station. In this case, it is assumed that charging stations A and B are selected as candidates. Charging server 80 calculates the charging time (expected charging time) required when external charging is performed using the charger provided in charging station A (SQ5). More specifically, charging server 80 acquires the fully charged capacity of power storage device 10. Then, charging server 80 calculates the charging time using: (i) the information about the fully charged capacity of power storage device 10; (ii) the information about the SOC of power storage device 10 received from vehicle 1; and (iii) the information about the charging capability of the charger provided in charging station A (the power amount that can be supplied by a quick charger/a normal charger per unit time). In addition, the fully charged capacity, for example, may be a catalog value in accordance with the vehicle type of vehicle 1 or may be an actual value received from vehicle 1 (the value calculated in vehicle 1).

Charging server 80 transmits the information about the charging time and the information about the user's preferences to advertisement server A in commercial facilities A provided in the vicinity of charging station A selected as a candidate.

Although the detailed explanation will not be repeated, also for charging station B, charging server 80 similarly calculates the charging time required when external charging is performed using the charger provided in charging station B. Then, charging server 80 transmits the information about the charging time and the user's preferences to advertisement server B in commercial facilities B provided in the vicinity of charging station B.

Based on the information received from charging server 80 (the information about the charging time and the user's preferences), each of advertisement servers A and B selects an appropriate advertisement from among the advertisement information stored in advertisement information database 91, and then transmits the selected advertisement to charging server 80 (SQ6 and SQ7). More specifically, advertisement server A first narrows down the advertisements for the facilities to more specific advertisements that match the user's preferences.

The advertisement information includes the information about the required time expected that the user will utilize each of facilities in commercial facilities A (required time for each leisure activity) (see FIG. 7) as described above. Based on this information, advertisement server A selects an appropriate advertisement by further narrowing down the advertisements to more specific advertisements that the relation between the required time of leisure activities and the charging time satisfies the user's desired conditions. For example, when the user desires reduction of the charging time, advertisement server A narrows down the advertisements for the facilities to more specific advertisements such that the required time of the leisure activities does not significantly exceed the charging time. In contrast, when the user desires to fully enjoy leisure activities, advertisement server A leaves the advertisements for various facilities without excessively narrowing down the advertisements even if the required time of the leisure activities exceeds the charging time to some extent.

Advertisement server A transmits the advertisement of each of the selected facilities to charging server 80. It is preferable that advertisement server A transmits, to charging server 80, the advertisement together with a coupon that can be used when the user utilizes the facility of the advertisement. Although the description thereof will not be repeated, the same process is performed also in advertisement server B.

When charging server 80 receives advertisements and coupons from advertisement servers A and B, charging server 80 creates a plan to spend the time period in the charging station and the commercial facilities (which will be hereinafter referred to as a "recommended plan"), and then, presents (delivers) the created plan together with the coupon to the user (SQ8). Typically, the recommended plan can be created by appropriately combining: (i) the time required for vehicle 1 to travel from its current location to the charging station; (ii) the charging time; (iii) the required time for the leisure activity in each of the facilities; and (iv) the time required for vehicle 1 to travel from the charging stand to its destination. In the present example, charging server 80 receives the advertisement and the coupon from each of advertisement servers A and B. Accordingly, it is desirable that charging server 80 creates at least one recommended plan in charging station A and commercial facilities A, and also creates at least one recommended plan in charging station B and commercial facilities B. The recommended plan created by charging server 80 is transmitted to vehicle 1 and displayed on touch panel-equipped display 42 of vehicle 1.

In addition, the processes in SQ6 to SQ8 correspond to the step of "delivering" according to the present disclosure. It is to be noted that advertisements and coupons may be directly delivered from advertisement servers A and B to the user (navigation device 40 or mobile terminal 7).

FIG. 11 is a diagram showing an example of a display screen showing a recommended plan. FIG. 12 is a diagram showing another example of the display screen showing a recommended plan. FIG. 11 shows the plan to spend the charging time at a cafeteria during quick charging in charging station A. On the other hand, FIG. 12 shows the plan to spend enjoying a movie and shopping during normal charging in charging station B. These recommended plans are shown merely by way of example, and a plurality of plans (plans to utilize various facilities) may be created for each of charging stations A and B.

FIG. 13 is a diagram showing an example of the display screen showing a coupon. Referring to FIG. 13, touch panel-equipped display 42 shows the information about the coupon that can be used when the user utilizes each of facilities (or privilege obtained when the user utilizes each of facilities) that match the user's preferences such as a cafeteria, a movie theater and a bowling stadium, for example.

Referring back to FIG. 8, the user compares the recommended plan and the coupon that are displayed on touch panel-equipped display 42 to select the user's desired plan and coupon by operating touch panel-equipped display 42 (SQ9). In the example shown in FIG. 8, the user selects the plan shown in FIG. 11 (the plan to spend the charging time at a cafeteria during quick charging in charging station A). The information about the user's desired plan is received by each of charging server 80 and advertisement server A (SQ10 and SQ11). Also, the information about the user's desired coupon is received by advertisement server A (SQ11).

Charging server 80 reserves a quick charger in charging station A and transmits, to advertisement server 90, a notification stating that a reservation has been completed (reservation completion notification) (SQ12). Although not shown, charging server 80 may inquire of the user as to whether the user desires to reserve the quick charger in charging station A. Then, when the user desires to make a reservation, charging server 80 may reserve the quick charger. When advertisement server 90 receives the reservation completion notification, it transmits the user's desired coupon to vehicle 1 (SQ13). When the user does not desire to reserve the charger, advertisement server 90 may transmit a coupon after external charging is actually started.

The coupon is transferred from vehicle 1 to mobile terminal 7 (SQ14). Thereby, when the user visits facilities such as a cafeteria during external charging, the user can present the coupon shown on the display of mobile terminal 7 to receive various services such as discounts.

As described above, according to the present embodiment, when charging of power storage device 10 is requested, charging server 80 selects the candidate for the combination of the charging station and the commercial facilities in accordance with the user's preferences. Then, advertisement server 90 delivers the advertisements and the coupons of the commercial facilities to the user. In consideration of the details of the advertisements and the coupons, the user then selects the charging station for external charging. This allows the user to effectively spend the charging time by utilizing the commercial facilities during external charging in the charging station.

Also, as having been described with reference to FIGS. 3 and 8, a plurality of different candidates (the candidate for the combination of charging station A and commercial facilities A, and the candidate for the combination of charging station B and commercial facilities B) are presented to the user. This causes a competition for acquiring more users between: the combination of charging station A and commercial facilities A; and the combination of charging station B and commercial facilities B. Thus, the user can receive presentation of coupons with more advantageous conditions such as a higher discount rate, for example. As a result, the motivation for the user to utilize such the information providing service can be enhanced.

On the other hand, the charging station selected by the user can receive the fee for charging while the commercial facilities utilized during external charging can receive the fees in exchange for their services. When the charging station and the commercial facilities are managed by separate entities, both the charging station and the commercial facilities cooperate with each other so that both the charging station and the commercial facilities can obtain profits. When the charging station and the commercial facilities are managed by the same entity, both the charging station and the commercial facilities can increase their sales due to the synergetic effect therebetween.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An information providing method for an electrically powered vehicle, the information providing method providing information that is used for charging a power storage device mounted in a vehicle with electric power supplied from outside the vehicle, the information providing method comprising:
    causing a server to receive a charging request including a desired charging manner, wherein the desired charging manner indicates a prioritization of (i) a charging time reduction; (ii) leisure activities during charging; or (iii) a reduction in fee;
    causing the server to select a plurality of candidates from among a plurality of charging facilities each configured to charge the power storage device in accordance with (i) location information about the vehicle, (ii) location information about each of the plurality of charging facilities, (iii) location information about each of a plurality of surrounding facilities where a user of the vehicle can stay during charging in a corresponding charging facility of the plurality of charging facilities, and (iv) the desired charging manner;
    causing the server to provide a terminal used by the user with information showing the plurality of candidates selected;
    causing the server to predict a charging time for the power storage device using (i) information about a state of charge (SOC) of the power storage device, (ii) information about a charging capability of a charger provided in each of the plurality of charging facilities, (iii) information about a fully charged capacity of the power storage device, and (iv) the desired charging manner;
    causing the server to calculate a time difference between the charging time predicted and an expected stay time for the user staying in a surrounding facility associated with each of the plurality of candidates selected;
    causing the server to deliver an advertisement for the surrounding facility associated with each of the plurality of candidates selected when the time difference is shorter than a prescribed value; and
    causing the server to receive information about a candidate selected with the terminal from among the plurality of candidates by the user referring to the advertisement for the surrounding facility; and
    causing the server to deliver a plan to spend time in the surrounding facility associated with each of the plurality of candidates selected, the plan including: (i) a time required for the electrically powered vehicle to travel from its current location to the candidate selected with the terminal; (ii) the charging time; (iii) the expected stay time for the user staying in the surrounding facility; and (iv) a time required for the electrically powered vehicle to travel from the candidate selected with the terminal to its destination.

* * * * *